US012792422B2

(12) United States Patent
Chen

(10) Patent No.: US 12,792,422 B2
(45) Date of Patent: Nov. 10, 2026

(54) RESOURCE ALLOCATION METHOD AND APPARATUS, READABLE MEDIUM, ELECTRONIC DEVICE, AND PROGRAM PRODUCT

(71) Applicant: TENCENT TECHNOLOGY (SHENZHEN) COMPANY LIMITED, Shenzhen (CN)

(72) Inventor: Kaixuan Chen, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 766 days.

(21) Appl. No.: 17/992,561

(22) Filed: Nov. 22, 2022

(65) Prior Publication Data

US 2023/0084784 A1 Mar. 16, 2023

Related U.S. Application Data

(63) Continuation of application No. PCT/CN2022/090113, filed on Apr. 29, 2022.

(30) Foreign Application Priority Data

May 31, 2021 (CN) ......................... 202110603576.7

(51) Int. Cl.
*G06F 9/50* (2006.01)
*A63F 13/358* (2014.01)
(Continued)

(52) U.S. Cl.
CPC .......... *G06F 9/5083* (2013.01); *A63F 13/358* (2014.09); *A63F 13/77* (2014.09); *G06Q 10/06315* (2013.01)

(58) Field of Classification Search
CPC ...... G06F 9/5083; A63F 13/358; A63F 13/77; G06Q 10/06315
See application file for complete search history.

(56) References Cited

U.S. PATENT DOCUMENTS 10,709,988 B2 * 7/2020 Schultz .................. A63F 13/44
10,979,516 B1 * 4/2021 Giannetti ............ H04L 41/0806
(Continued)

FOREIGN PATENT DOCUMENTS

CN 106492459 A 3/2017
CN 107229995 A 10/2017
(Continued)

OTHER PUBLICATIONS

CN112860403A English Translation (Year: 2021).*
(Continued)

*Primary Examiner* — Bradley A Teets
*Assistant Examiner* — Willy W Huaracha
(74) *Attorney, Agent, or Firm* — Sughrue Mion, PLLC

(57) ABSTRACT

A resource allocation method and apparatus, a readable medium, an electronic device and a program product are provided. The resource allocation method includes: collecting a current online user quantity of a cloud game in a current time period, and counting an online user quantity of the cloud game in a historical time cycle; predicting a target online user change quantity of the cloud game in a future time period according to the current online user quantity and the online user quantity of the cloud game in the historical time cycle, the future time period being a time period having a same time length as the current time period; and dynamically adjusting, according to the target online user change quantity, cloud computing resources allocated to the cloud game, preloading a game client being based on the cloud computing resources.

18 Claims, 12 Drawing Sheets

(51) Int. Cl.
*A63F 13/77* (2014.01)
*G06Q 10/0631* (2023.01)

(56) References Cited

U.S. PATENT DOCUMENTS

| | | | | |
|---|---|---|---|---|
| 2004/0163007 | A1* | 8/2004 | Mirkhani | G06F 11/008 714/1 |
| 2013/0117549 | A1* | 5/2013 | Lin | G06F 9/45541 713/2 |
| 2013/0265432 | A1* | 10/2013 | Freedman | H04N 7/181 348/150 |
| 2013/0274021 | A1* | 10/2013 | Novotny | A63F 13/792 463/42 |
| 2014/0228108 | A1* | 8/2014 | Bruno, Jr. | G06F 9/5077 463/29 |
| 2014/0344457 | A1* | 11/2014 | Bruno, Jr. | A63F 13/335 709/226 |
| 2015/0287057 | A1 | 10/2015 | Baughman et al. | |
| 2016/0283948 | A1* | 9/2016 | Snapir | G06Q 10/20 |
| 2022/0292689 | A1* | 9/2022 | Zhang | G06T 7/11 |

FOREIGN PATENT DOCUMENTS

| | | | |
|---|---|---|---|
| CN | 109714395 | A | 5/2019 |
| CN | 111597050 | A | 8/2020 |
| CN | 112463386 | A | 3/2021 |
| CN | 112685187 | A | 4/2021 |
| CN | 112860403 | A | 5/2021 |
| CN | 113230658 | A | 8/2021 |

OTHER PUBLICATIONS

CN109714395A English Translation (Year: 2019).*

Zhang et al. "Dynamic resource allocation for spot markets in cloud computing environments." 2011 Fourth IEEE International Conference on Utility and Cloud Computing. IEEE, pp. 178-185. (Year: 2011).*

CN 112350756 A Machine English Translation (Year: 2021).*

International Search Report for PCT/CN2022/090113 dated, Jul. 26, 2022 (PCT/ISA/210).

Written Opinion of the International Searching Authority for PCT/CN2022/090113 dated, Jul. 26, 2022 (PCT/ISA/237).

Communication issued Mar. 28, 2025 in Chinese Patent Application No. 202110603576.7.

* cited by examiner

| Operation monitoring dimension | Representative meaning | Impact weight |
|---|---|---|
| Growth trend of online people | Directly affect the a game client preload quantity | High |
| Quantity of current queuing people | The game client preload quantity is insufficient | High |
| Quantity of historical online people | Have important reference value for predicting a quantity of online people and an online growth rate in this cycle | Medium |
| Quantity of historical queuing people | Have important reference value for predicting a quantity of online people and an online growth rate in this cycle | Medium |
| Average queuing duration of users | Attractiveness of the game to the users | Low |
| Retention ratio of users | User stickiness of the game | Low |
| Average game duration of users | Whether the users are heavy players | Medium |
| Average revenue of users | Determine the commercial value of the game | Medium |

FIG. 9

RESOURCE ALLOCATION METHOD AND APPARATUS, READABLE MEDIUM, ELECTRONIC DEVICE, AND PROGRAM PRODUCT

RELATED APPLICATION

This application is a continuation application of International Application No. PCT/CN2022/090113, filed on Apr. 29, 2022, which claims priority to Chinese Patent Application No. 202110603576.7, filed with the China National Intellectual Property Administration on May 31, 2021, the disclosures of which are incorporated by reference herein in their entireties.

FIELD

The disclosure relates to the field of cloud gaming technologies, and specifically, to a resource allocation method, a resource allocation apparatus, a computer-readable medium, and an electronic device.

BACKGROUND

Cloud gaming is a game mode based on cloud computing. Operations such as logic computing and picture rendering that should have been performed on a terminal device are performed on a cloud server. Game pictures and game instructions obtained through the logic computing and the picture rendering are compressed by the cloud server and then transmitted to the terminal device through a network. The terminal device only needs to simply perform data decoding and screen display and interact terminal device instructions to provide a user with a game experience.

Since the main computing operations are concentrated on the cloud server, the cloud server is useful for resource allocation for a game client. If computing resources cannot be properly allocated, problems such as an excessively long game waiting time for the user or an excessive waste of resources are caused.

SUMMARY

The present disclosure provides a resource allocation method, a resource allocation apparatus, a computer-readable medium, an electronic device, and a program product, to overcome, at least to some extent, the technical problems in the related art such as misallocation of resources, a long game waiting time for a user, and a waste of computing resources.

Other features and advantages of the disclosure become obvious through the following detailed descriptions, or may be partially learned through the practice of the disclosure.

According to an aspect of the embodiments of the disclosure, a resource allocation method is provided, including: collecting a current online user quantity of a cloud game in a current time period, and counting an online user quantity of the cloud game in a historical time cycle, the historical time cycle including one or more historical time periods corresponding to the current time period; predicting a target online user change quantity of the cloud game in a future time period according to the current online user quantity and the online user quantity of the cloud game in the historical time cycle, the future time period being a time period having a same time length as the current time period; and dynamically adjusting, according to the target online user change quantity, cloud computing resources allocated to the cloud game, preloading a game client being based on the cloud computing resources.

According to an aspect of the embodiments of the disclosure, a resource allocation apparatus is provided, including: at least one memory configured to store program code; and at least one processor configured to read the program code and operate as instructed by the program code, the program code including user quantity acquisition code, configured to cause the at least one processor to collect a current online user quantity of a cloud game in a current time period, and counting an online user quantity of the cloud game in a historical time cycle, the historical time cycle including one or more historical time periods corresponding to the current time period; change quantity determining code, configured to cause the at least one processor to predict a target online user change quantity of the cloud game in a future time period according to the current online user quantity and the online user quantity of the cloud game in the historical time cycle, the future time period being a continuous time period with the same time length as the current time period; and resource dynamic adjustment code, configured to cause the at least one processor to dynamically adjust, according to the target online user change quantity, cloud computing resources allocated to the cloud game, preloading a game client based on the cloud computing resources.

According to an aspect of the embodiments of the disclosure, a non-volatile computer-readable storage medium, storing a computer program that when executed by at least one processor causes the at least one processor to implement the resource allocation method according to the foregoing technical solutions.

According to an aspect of the embodiments of the disclosure, an electronic device is provided, including: a processor; and a memory, configured to store executable instructions of the processor, the processor being configured to perform the resource allocation method according to the foregoing technical solutions by executing the executable instructions.

According to an aspect of the embodiments of the disclosure, a computer program product or a computer program is provided, including computer instructions, the computer instructions being stored in a computer-readable storage medium. A processor of a computer device reads the computer instructions from the computer-readable storage medium, and executes the computer instructions, causing the computer device to perform the resource allocation method according to the foregoing technical solutions In example embodiments of the disclosure, by acquiring a current online user quantity and an online user quantity of a cloud game in a historical time cycle, a target online user change quantity in a future time period can be predicted, where the target online user change quantity indicates new online users in the future time period. Therefore, a quantity of cloud computing resources required for preloading a game client in the future time period is embodied, and then cloud computing resources allocated to the cloud game for preloading the game client can be dynamically adjusted according to the predicted target online user change quantity, so that the cloud computing resources allocated to the cloud game are more proper. It can be seen that the disclosure can properly perform dynamic adjustment on the allocation quantity of the cloud computing resources in combination with historical statistical data and currently monitored data, to avoid resource waste or poor game experience caused by misallocation while reducing the game waiting time for a user, thereby reducing operational costs of the cloud game and reducing operational complexity of the cloud game.

It is to be understood that the foregoing general descriptions and the following detailed descriptions are merely exemplary and explanatory, and cannot limit the disclosure.

BRIEF DESCRIPTION OF THE DRAWINGS

The accompanying drawings herein are incorporated into the specification and constitute a part of this specification, show example embodiments that conform to the disclosure, and are used for describing the principles of the disclosure together with this specification. The accompanying drawings described below are merely some embodiments of the disclosure, and a person of ordinary skill in the art may further obtain other accompanying drawings according to the accompanying drawings without creative efforts.

FIG. 9 schematically shows a description of weights of operation monitoring dimensions in an application scenario according to an embodiment of the disclosure.

DETAILED DESCRIPTION

Figure 1:
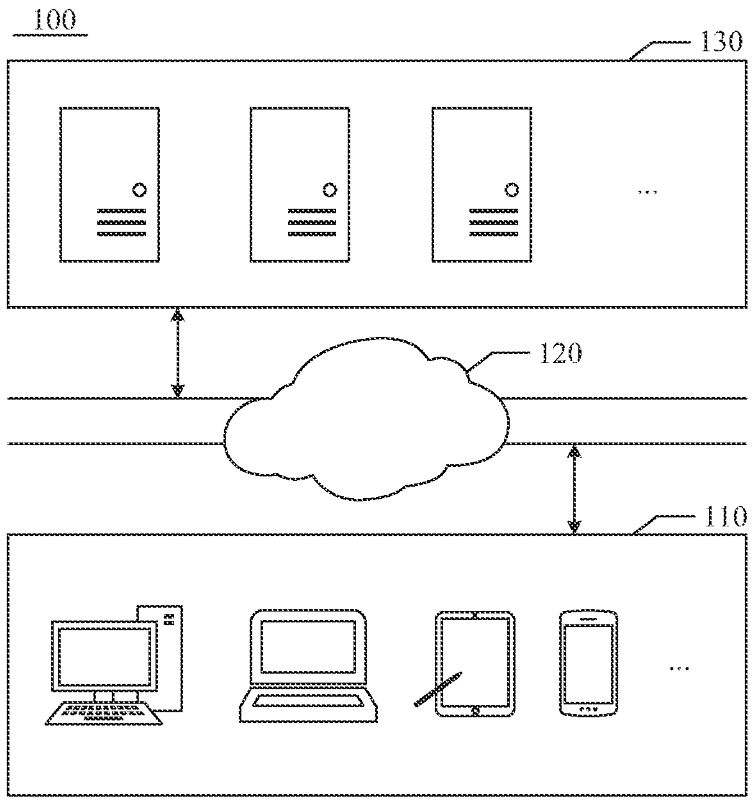
FIG. 1 schematically shows a block diagram of an exemplary system architecture to which the technical solutions according to the disclosure are applied.

Now, exemplary implementations are described comprehensively with reference to the accompanying drawings. However, the exemplary implementations may be implemented in various forms, and it is not to be understood as being limited to the examples described herein. Conversely, the implementations are provided to make the disclosure more comprehensive and complete, and comprehensively convey the idea of the exemplary implementations to a person skilled in the art.

In addition, the described features, structures or characteristics may be combined in one or more embodiments in any appropriate manner. In the following descriptions, a lot of specific details are provided to give a comprehensive understanding of the embodiments of the disclosure. However, a person of ordinary skill in the art is to be aware that, the technical solutions in the disclosure may be implemented without one or more of the particular details, or another method, unit, apparatus, or step may be used. In other cases, well-known methods, apparatuses, implementations, or operations are not shown or described in detail, in order not to obscure the aspects of the disclosure.

The block diagrams shown in the accompanying drawings are merely functional entities and do not necessarily correspond to physically independent entities. That is, such functional entities may be implemented by using software, or implemented in one or more hardware modules or integrated circuits, or implemented in different networks and/or processor apparatuses and/or micro-controller apparatuses.

The flowcharts shown in the accompanying drawings are merely examples for descriptions, do not necessarily include all content and operations/steps, and are not necessarily performed in the described orders. For example, some operations/steps may be further divided, while some operations/steps may be combined or partially combined. Therefore, an actual execution order may vary depending on an actual situation.

The technical solutions provided in the embodiments of the disclosure mainly relate to a cloud technology, and specifically, to a cloud gaming technology implemented based on cloud computing.

The cloud technology is a hosting technology that unifies a series of resources such as hardware, software, and networks in a wide area network or a local area network to implement computing, storage, processing, and sharing of data. The cloud technology is a collective name of a network technology, an information technology, an integration technology, a management platform technology, an application technology, and the like based on an application of a cloud computing business mode, and may form a resource pool, which is used as required, and is flexible and convenient. The cloud computing technology becomes an important support. A background service of a technical network system requires a large amount of computing and storage resources, such as video websites, picture websites, and more portal websites. As the Internet industry is highly developed and applied, each article may have its own identifier in the future and needs to be transmitted to a background system for logical processing. Data at different levels is separately processed, and data in various industries requires strong system support, which can only be implemented through cloud computing.

The cloud computing is a service delivery and use mode, and specifically refers to obtaining a required service through a network in an on-demand and expandable manner. The service may be IT and software, Internet-related, or another service. The cloud computing is a product of the integration of conventional computer and network technologies, such as grid computing, distributed computing, parallel computing, utility computing, network storage technologies, virtualization, and load balance. With the development of the Internet, real-time data stream, and diversified connecting devices, and the promotion of needs such as search services, social networks, mobile commerce, and open collaboration, the cloud computing has developed rapidly. Different from the previous parallel distributed computing, the emergence of cloud computing drives the entire Internet mode and enterprise management mode to undergo revolutionary changes in concept.

Cloud gaming, also referred to as gaming on demand, is an online gaming technology based on the cloud computing technology. The cloud gaming technology enables a thin client with relatively limited graphics processing and data computing capabilities to run a high-quality game. In a cloud gaming scenario, the game does not run on a game terminal of a player, but in a cloud server, and a game scene is rendered by the cloud server as a video/audio stream and transmitted to the game terminal of the player through a network. The game terminal of the player does not need to have strong graphics computing and data processing capabilities, but only need to have basic streaming media playback capabilities and the capability to acquire input instructions of the player and transmit the input instructions to the cloud server.

FIG. 1 schematically shows a block diagram of an exemplary system architecture to which the technical solutions according to the disclosure are applied.

As shown in FIG. 1, the system architecture 100 may include a terminal device 110, a network 120, and a server 130. The terminal device 110 may include various electronic devices such as a smartphone, a tablet computer, a notebook computer, and a desktop computer. The server 130 is a cloud server for providing basic cloud computing services such as a cloud service, a cloud database, cloud computing, a cloud function, cloud storage, a network service, cloud communication, a middleware service, a domain name service, a security service, a CDN, big data and an artificial intelligence platform. The network 120 may be a communication medium capable of providing various connection types of communication links between the terminal device 110 and the server 130, for example, a wired communication link or a wireless communication link.

The system architecture in this example embodiment of the disclosure may include any quantities of terminal devices, networks, and servers according to actual needs. For example, the server 130 may be a server cluster formed by a plurality of server devices. In addition, the technical solutions provided in this example embodiment of the disclosure may be mainly applied to the server 130, or may be jointly implemented by the terminal device 110 and the server 130, which is not specifically limited in the disclosure.

Figure 2:
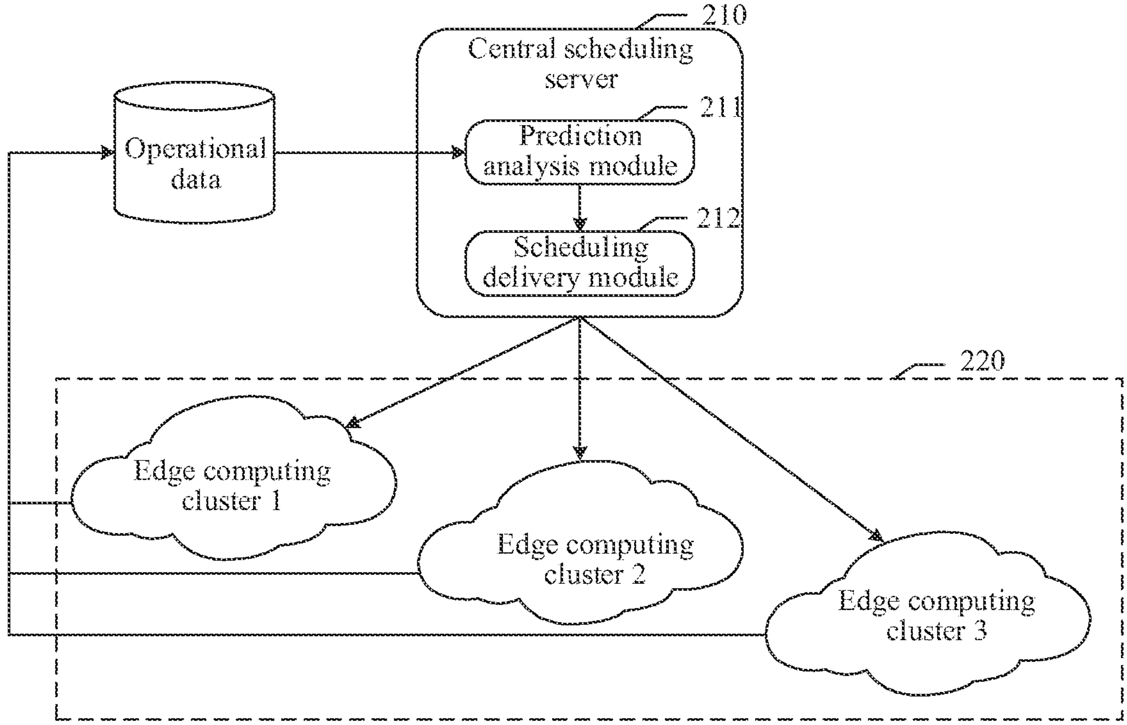
FIG. 2 schematically shows a block diagram of an overall architecture of a cloud gaming server according to an example embodiment of the disclosure.

FIG. 2 schematically shows a block diagram of an overall architecture of a cloud gaming server according to an example embodiment of the disclosure. As shown in FIG. 2, the cloud gaming server in this example embodiment of the disclosure includes at least one central scheduling server 210 and a plurality of edge computing clusters 220 distributed across regions that perform data communication with the central scheduling server 210. The edge computing cluster 220 is a server cluster configured to provide a cloud gaming service for a user. As shown in FIG. 2, the edge computing clusters 220 may be an edge computing cluster 1, an edge computing cluster 2, and an edge computing cluster 3. FIG. 2 only uses the three edge computing clusters 220 as examples. Certainly, there may also be a plurality of other edge computing clusters 220, which are not shown in FIG. 2. The central scheduling server 210 includes a prediction analysis module 211 and a scheduling delivery module 212. The prediction analysis module 211 can analyze and calculate online data and user data in real time to obtain pre-pulling values of games in clusters (that is, cloud computing resources). The scheduling delivery module 212 can deliver a calculation result to the edge computing clusters 220 for real-time adjustment.

A game start process of a cloud game includes operations such as scheduling and allocating resources, mirroring transmission of game client, and updating and pulling up of client. It generally takes tens of seconds to several minutes to complete all operations. An excessively long waiting time for a user gradually wears away patience of the user, which is extremely unfavorable for experience of the cloud game.

In view of this, in this example embodiment of the disclosure, the cloud computing resources may pre-pulled by a certain quantity in advance in the edge computing cluster 220, that is, the client is preloaded. When a new user enters the game, the preloaded cloud computing resources may be used to directly provide the game service for the user, thereby reducing the game waiting time of the user. Pre-pulling resources can indeed greatly reduce an access time of the user, but the problem of the optimal solution of the pre-pulling quantity is also introduced. That is, much pre-pulling causes resource waste and higher cost, while little pre-pulling causes worse game experience. For the problems existing in the related art, in this example embodiment of the disclosure, historical cycle data of a cloud gaming cluster is used to properly predict online values of users in this cycle, thereby automatically performing dynamic prediction and adjustment on the pre-pulling quantity of the games in the clusters to achieve an optimal waiting experience of the user with the least cost.

The technical solutions such as a resource allocation method, a resource allocation apparatus, a computer-readable medium, and an electronic device provided in the disclosure are described in detail below with reference to specific implementations.

Figure 3:
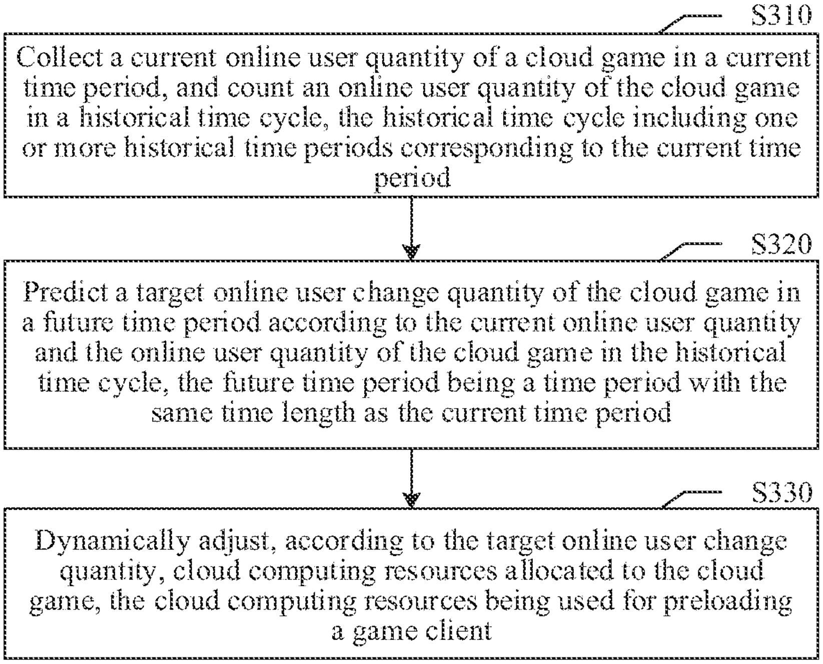
FIG. 3 schematically shows a flowchart of operations of a resource allocation method according to an example embodiment of the disclosure.

FIG. 3 schematically shows a flowchart of operations of a resource allocation method according to an example embodiment of the disclosure. The resource allocation method may be performed by an electronic device, such as the server 130 shown in FIG. 1, or the terminal device 110 and the server 130. This example embodiment of the disclosure is described through the resource allocation method performed by the server 130. As shown in FIG. 3, the resource allocation method may mainly include the following S310 to S330.

S310: Collect a current online user quantity of a cloud game in a current time period, and count an online user quantity of the cloud game in a historical time cycle, the historical time cycle including one or more historical time periods corresponding to the current time period.

S320: Predict a target online user change quantity of the cloud game in a future time period according to the current online user quantity and the online user quantity of the cloud game in the historical time cycle, the future time period being a time period with the same time length as the current time period.

S330: Dynamically adjust, according to the target online user change quantity, cloud computing resources allocated to the cloud game, the cloud computing resources being used for preloading a game client.

In the resource allocation method provided in this example embodiment of the disclosure, by acquiring a current online user quantity and an online user quantity of a cloud game in a historical time cycle, a target online user change quantity in a future time period can be predicted, where the target online user change quantity indicates new online users in the future time period. Therefore, a quantity of cloud computing resources required for preloading a game client in the future time period is embodied, and then cloud computing resources allocated to the cloud game for preloading the game client can be dynamically adjusted according to the predicted target online user change quantity, so that the cloud computing resources allocated to the cloud game are more proper. It can be seen that the disclosure can properly perform dynamic adjustment on the allocation quantity of the cloud computing resources in combination with historical statistical data and currently monitored data, to avoid resource waste or poor game experience caused by misallocation while reducing the game waiting time for a user, thereby reducing operational costs of the cloud game and reducing operational complexity of the cloud game.

The operations of the resource allocation method in this example embodiment of the disclosure are described in detail below respectively.

In S310, a current online user quantity of a cloud game in a current time period is collected, and an online user quantity of the cloud game in a historical time cycle is counted, where the historical time cycle includes one or more historical time periods corresponding to the current time period.

The current time period is a continuous time period with a specified duration S that includes a current time. In an example embodiment of the disclosure, the current time period may be a time period with fixed start-end time points formed by continuously segmenting a game time stream. For example, if the current time is 4:14:38 and the specified duration S is 5 minutes, the current time period may be a 5-minute time period with start-end time points of 4:10:0 and 4:15:0. In another example embodiment of the disclosure, the current time period may be a dynamically changing time period with the current time as a time end point. For example, if the current time is 4:14:38 and the specified duration S is 5 minutes, the current time period may be a 5-minute time period with start-end time points of 4:9:38 and 4:14:38.

Figure 4:
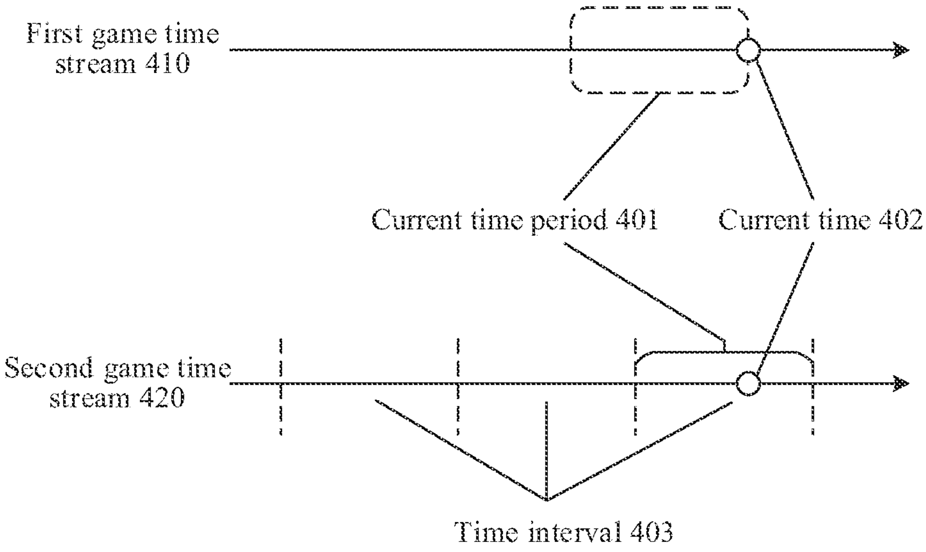
FIG. 4 schematically shows a diagram of a distribution relationship between a current time and a current time period in game time streams according to some example embodiments of the disclosure.

FIG. 4 schematically shows a diagram of a distribution relationship between a current time and a current time period in game time streams according to some embodiments of the disclosure. As a first game time stream 410 shown in the upper part of FIG. 4, in some embodiments of the disclosure, the current time period 401 is a dynamically changing time period with the current time 402 as the time end point. As time passes, the current time period 401 slides forward along with the current time 402. As a second game time stream 420 shown in the lower part of FIG. 4, in some embodiments of the disclosure, a plurality of time intervals 403 with the same time length are obtained through division according to a specified time length, and a time interval in which the current time 402 is located is the current time period 401.

The current online user quantity is used for reflecting the quantity of online game users in the current time period. The current online user quantity may be collected in many ways. In an example embodiment of the disclosure, the current online user quantity is a quantity sequence obtained by real-time collection on the quantity of online game users in the current time period. For example, a time interval T is used as a data sampling interval, user quantity sampling points with the quantity of S/T changing with time may be collected in the current time period, and these user quantity sampling points are arranged in chronological order to form the quantity sequence representing the current online user quantity. In some other optional implementations, the current online user quantity may also be a real-time online user quantity obtained by real-time collection on the quantity of online game users at the current time, or an average quantity obtained by averaging a plurality of user quantity sampling points in the current time period.

Figure 5:
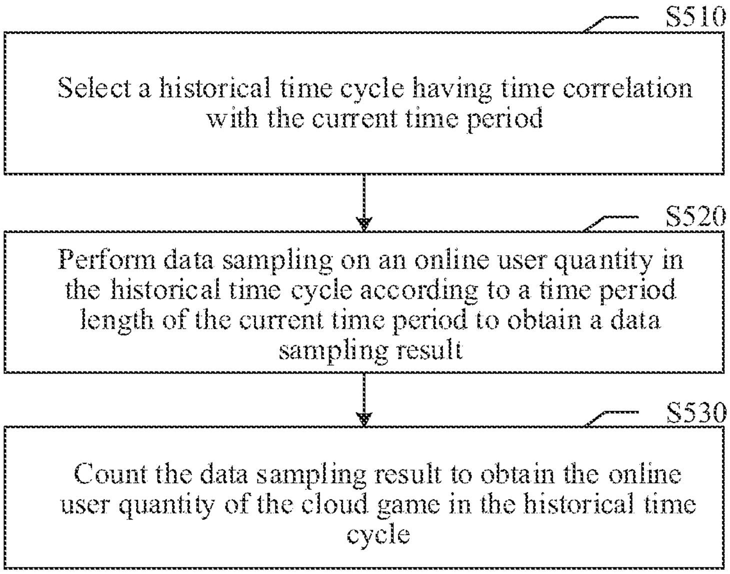
FIG. 5 schematically shows a flowchart of operations of counting an online user quantity of a cloud game in a historical time cycle according to an example embodiment of the disclosure.

In an example embodiment of the disclosure, based on a historical time cycle before a current time period, an online user quantity of a cloud game in the historical time cycle can be counted. FIG. 5 schematically shows a flowchart of operations of counting an online user quantity of a cloud game in a historical time cycle according to an embodiment of the disclosure. As shown in FIG. 5, the counting an online user quantity of a cloud game in a historical time cycle in S310 may include the following S510 to S530.

S510: Select a historical time cycle having time correlation with the current time period.

There may be many manners for selecting the historical time cycle having time correlation with the current time period, and two manners are described in this example embodiment of the disclosure. In an example embodiment of the disclosure, one manner may be: first acquiring a current time cycle in which the current time period is located, where the current time cycle has a specified time length and fixed start-end time points; and then selecting one or more historical time cycles with the same time length as the current time cycle.

For example, the current time period is a continuous time period with a time length of 5 minutes, and the current time cycle may be a time cycle with a time length of 1 hour or 24 hours. The 24 hours is used as an example. If the current time cycle is from 0:00 to 24:00 of a current day, the corresponding selected historical time cycle may be from 0:00 to 24:00 of a previous day or several days before the current day.

In an example embodiment of the disclosure, the other manner may be: first acquiring a sliding time window synchronously moving with the current time period, where the sliding time window has a specified time length and dynamic start-end time points; and then selecting a historical time cycle continuous with the current time period according to the sliding time window.

For example, the current time period is a continuous time period with a time length of 5 minutes, and the sliding time window may be a time window with a time length of 1 hour or 24 hours. The sliding time window with a length of 24 hours is used as an example. If the current time period is the time period from 4:10 to 4:15, the historical time cycle may be the continuous time cycle from 4:10 yesterday to 4:10 today.

In this way, the historical time cycle having strong time correlation with the current time period can be acquired, thereby making the online user quantity of the cloud game in the historical time cycle more referential, so that cloud computing resources can be adjusted more accurately later, to allocate the cloud computing resources more properly.

Figure 6:
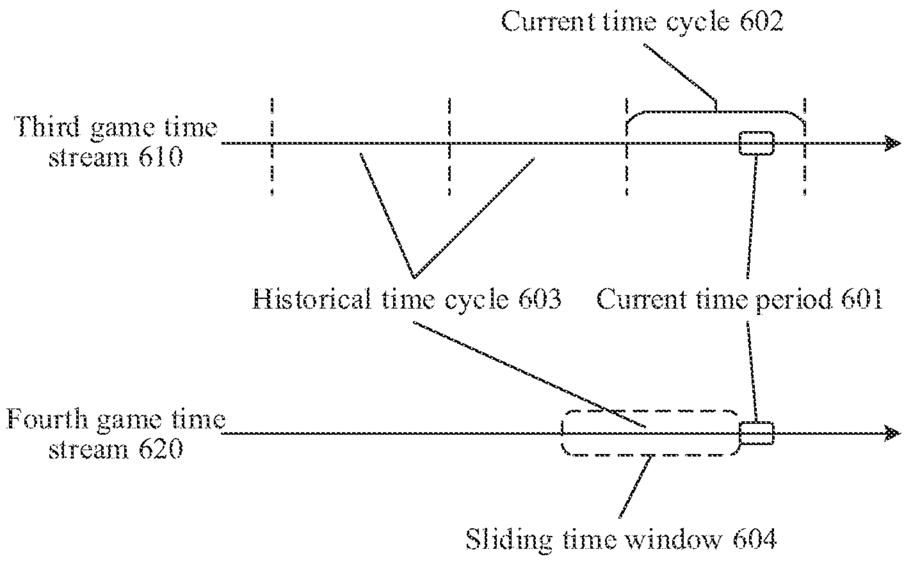
FIG. 6 schematically shows a diagram of a distribution relationship between a current time period and a historical time cycle in game time streams according to some example embodiments of the disclosure.

FIG. 6 schematically shows a diagram of a distribution relationship between a current time period and a historical time cycle in game time streams according to some embodiments of the disclosure.

As a third game time stream 610 shown in the upper part of FIG. 6, in some example embodiments of the disclosure, a plurality of time cycles may be obtained through division in the time stream according to a fixed time length, the time cycle in which the current time period 601 is located is a current time cycle 602, and each time cycle distributed before the current time cycle 602 is the historical time cycle 603.

As a fourth game time stream 620 shown in the lower part of FIG. 6, in some embodiments of the disclosure, a sliding time window 604 moving synchronously with the current time period 601 may be determined based on the current time period 601, and a time interval covered by the sliding time window 604 is the historical time cycle 603.

S520: Perform data sampling on an online user quantity in the historical time cycle according to a time period length of the current time period to obtain a data sampling result.

In the determined historical time cycle, the data sampling is performed in the same way as the current time period. For example, if a time length of the current time period is 5 minutes, the data sampling is also performed on the online user quantity in the historical time cycle at the time interval of 5 minutes.

S530: Count the data sampling result to obtain the online user quantity of the cloud game in the historical time cycle.

In an example embodiment of the disclosure, the current online user quantity is a quantity sequence formed by the user quantity sampling points in the current time period, and the online user quantity of the cloud game in the historical time cycle may include a plurality of quantity sequences corresponding quantity sequence.

In an example embodiment of the disclosure, the current online user quantity is the quantity of real-time online users at the current time, and the online user quantity of the cloud game in the historical time cycle may be the quantity of real-time online users recorded at each time point in the historical time cycle.

In an example embodiment of the disclosure, the current online user quantity is an average value of the plurality of user quantity sampling points in the current time period, and the online user quantity of the cloud game in the historical time cycle may be a plurality of average values calculated in the historical time cycle according to the user quantity sampling points recorded in the historical time periods respectively. The plurality of average values correspond to the plurality of historical time periods respectively.

In S320, a target online user change quantity of the cloud game in a future time period is predicted according to the current online user quantity and the online user quantity of the cloud game in the historical time cycle, where the future time period is a time period with the same time length as the current time period.

Generally, the future time period and the current time period have the same time length. However, in some cases, to improve prediction accuracy, in an example embodiment of the disclosure, the future time period may also be a continuous time period with the current time period. For example, if the current time period is the time period from 4:10 to 4:15 of the current day, the corresponding future time period may be the time period from 4:15 to 4:20 of the current day.

In an example embodiment of the disclosure, the future time period may also be a time period with a specified time distance from the current time period. For example, if the current time period is the time period from 4:10 to 4:15 of the current day, the corresponding future time period may be the time period from 4:10 to 4:15 tomorrow.

Figure 7:
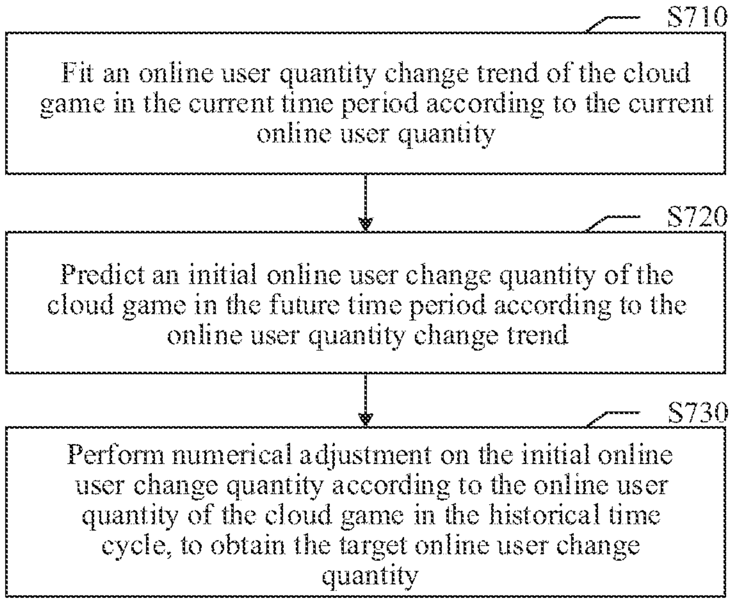
FIG. 7 schematically shows a flowchart of operations of a method for predicting a target online user change quantity according to an example embodiment of the disclosure.

FIG. 7 schematically shows a flowchart of operations of a method for predicting a target online user change quantity according to an embodiment of the disclosure. As shown in FIG. 7, based on the foregoing embodiments, the predicting a target online user change quantity of the cloud game in a future time period according to the current online user quantity and the online user quantity of the cloud game in the historical time cycle in S320 may include the following S710 to SS730.

S710: Fit an online user quantity change trend of the cloud game in the current time period according to the current online user quantity.

In an example embodiment of the disclosure, the current online user quantity may be linearly fitted to obtain the online user quantity change trend of the game in the current time period. The online user quantity change trend may be represented as a linear fitting model. For example, the current online user quantity includes the quantity sequence formed by the plurality of real-time online users in the current time period, and the quantity sequence may be linearly fitted by using a least square method or another fitting method to obtain a linear fitting formula that represents the online user quantity change trend.

S720: Predict an initial online user change quantity of the cloud game in the future time period according to the online user quantity change trend.

According to the online user quantity change trend, a predicted value of the online user quantity of the cloud game in the future time period may be predicted value, and the initial online user change quantity in the future time period may be obtained by taking a difference between the predicted value and the current online user quantity. In an example embodiment of the disclosure, first, the predicted values of the online user quantity on a plurality of time points in the future time period may be predicted, then, a target online user quantity may be calculated and determined according to the plurality of predicted values, and the initial online user change quantity may be determined according to a difference between the target online user quantity and the current online user quantity. The target online user quantity may be, for example, an average or maximum value of the plurality of predicted values.

S730: Perform numerical adjustment on the initial online user change quantity according to the online user quantity of the cloud game in the historical time cycle, to obtain the target online user change quantity.

In an example embodiment of the disclosure, numerical adjustment may be performed on am online user change quantity according to a historical online user quantity. The adjustment method may mainly include adding the numerical value of the online user quantity of the cloud game in the historical time cycle to the initial online user change quantity according to a preset weight so as to correct the initial online user change quantity.

The embodiments of the disclosure provide a variety of methods to implement S730, which will be described one by one next. In an example embodiment of the disclosure, the method of performing numerical adjustment on the initial online user change quantity according to the online user quantity of the cloud game in the historical time cycle may include: selecting one or more first contemporaneous time periods that have corresponding start-end time points with the current time period from the historical time cycle; selecting a first historical contemporaneous quantity corresponding to the first contemporaneous time period from the online user quantity of the cloud game in the historical time cycle; and performing weighted fusion on the first historical contemporaneous quantity and the initial online user change quantity according to a preset quantity weight to obtain the target online user change quantity, where a quantity weight of the initial online user change quantity is greater than a quantity weight of the first historical contemporaneous quantity.

The first historical contemporaneous quantity has a great impact on the online user quantity. Therefore, adding the first historical contemporaneous quantity to the initial online user change quantity according to the preset weight can better correct the initial online user change quantity, thereby obtaining a more accurate target online user change quantity.

In another example embodiment of the disclosure, the method of performing numerical adjustment on the initial online user change quantity according to the online user quantity of the cloud game in the historical time cycle may further include: selecting one or more second contemporaneous time periods that have corresponding start-end time points with the future time period from the historical time cycle; and selecting a second historical contemporaneous quantity corresponding to the second contemporaneous time period from the online user quantity of the cloud game in the historical time cycle. Based on this, the weighted fusion may be performed on the first historical contemporaneous quantity, the second historical contemporaneous quantity, and the initial online user change quantity according to the preset quantity weight to obtain the target online user change quantity, where the quantity weight of the first historical contemporaneous quantity is greater than a quantity weight of the second historical contemporaneous quantity.

For example, if the current time period is the time period from 4:10 to 4:15 of the current day, the future time period may be the time period from 4:15 to 4:20 after that. The first contemporaneous time period corresponding to the current time period selected in the historical time cycle may include the time period from 4:10 to 4:15 of the previous day, the previous two days, or the previous three days. Correspondingly, the second contemporaneous time period corresponding to the future time period selected in the historical time cycle may include the time period from 4:15 to 4:20 of the previous day, the previous two days, or the previous three days.

Apart from the first historical contemporaneous quantity, the second historical contemporaneous quantity also has an impact on the online user quantity. Therefore, the first historical contemporaneous quantity and the second historical contemporaneous quantity may also be added to the initial online user change quantity according to the respective preset weights, to correct the initial online user change quantity more accurately, thereby obtaining a more accurate target online user change quantity.

Compared with the second contemporaneous time period, the first contemporaneous time period has a greater impact on the online user quantity. Therefore, a larger quantity weight may be configured for the first historical contemporaneous quantity than for the second historical contemporaneous quantity, thereby improving the prediction accuracy of the target online user change quantity.

In some cases, to avoid a sudden influx of a large quantity of game users into a game server, the cloud game can control some game users to queue up to enter the game in order. A quantity of game users in a state of waiting to enter the game in the current time period is a current queuing user quantity. Correspondingly, a queuing user quantity in each historical time period may be recorded in the historical time cycle. The method of obtaining the current queuing user quantity and the queuing user quantity of the cloud game in the historical time cycle is similar to the method of obtaining the current online user quantity and the online user quantity of the cloud game in the historical time cycle, which is not described herein again.

In this case, to cope with the sudden influx of the game users, after the target online user change quantity is obtained, the target online user change quantity may be corrected based on the current queuing user quantity and the queuing user quantity of the cloud game in the historical time cycle, so as to quickly correct the allocated cloud computing resources. Specifically, a current queuing user quantity of the cloud game in the current time period may be collected, and a queuing user quantity of the cloud game in the historical time cycle may be counted. Then, numerical adjustment is performed on the target online user change quantity according to the current queuing user quantity and the queuing user quantity of the cloud game in the historical time cycle, to obtain the target online user change quantity after the numerical adjustment.

In an example embodiment of the disclosure, weighted fusion may be performed on the current queuing user quantity, the queuing user quantity of the cloud game in the historical time cycle, and the target online user change quantity according to a preset quantity weight to obtain the target online user change quantity after the numerical adjustment, where a quantity weight of the target online user change quantity is greater than or equal to a quantity weight of the current queuing user quantity, and the quantity weight of the current queuing user quantity is greater than a quantity weight of the queuing user quantity of the cloud game in the historical time cycle. Through the foregoing method, the sudden influx of the game users can be coped with. That is, the target online user change quantity is corrected based on the current queuing user quantity and the queuing user quantity of the cloud game in the historical time cycle, so as to quickly correct the allocated cloud computing resources, thereby ensuring the proper allocation of the cloud computing resources.

In S330, cloud computing resources allocated to the cloud game are dynamically adjusted according to the target online user change quantity, where the cloud computing resources are used for preloading a game client.

In the case that the numerical adjustment is performed on the target online user change quantity based on the current queuing user quantity and the queuing user quantity of the cloud game in the historical time cycle to obtain the target online user change quantity after the numerical adjustment, S330 may be implemented by dynamically adjusting, according to the target online user change quantity after the numerical adjustment, the cloud computing resources allocated to the cloud game.

Figure 8:
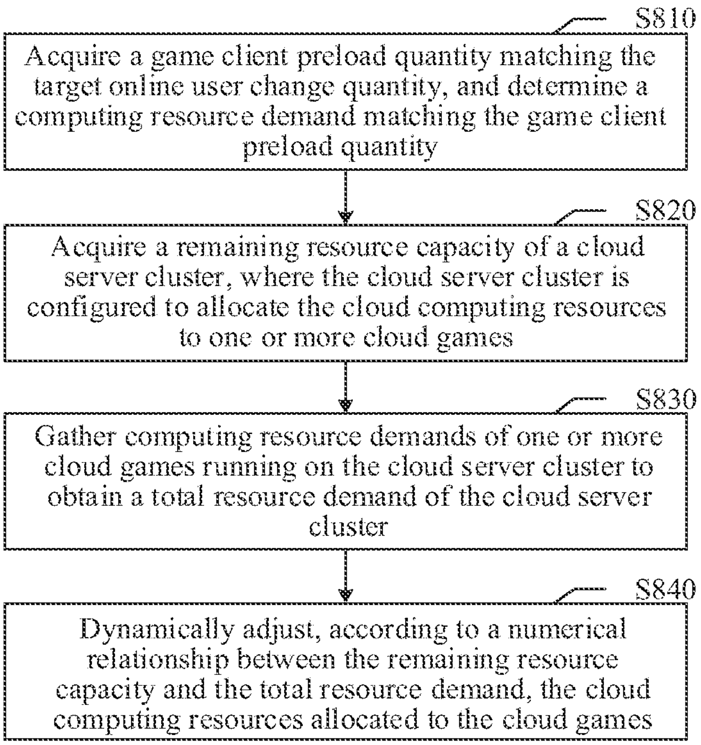
FIG. 8 schematically shows a flowchart of operations of a method for dynamically allocating cloud computing resources according to an example embodiment of the disclosure.

FIG. 8 schematically shows a flowchart of operations of a method for dynamically allocating cloud computing resources according to an example embodiment of the disclosure. As shown in FIG. 8, based on the foregoing embodiments, the dynamically adjusting, according to the target online user change quantity, the cloud computing resources allocated to the cloud game for preloading the game client in S330 may include the following S810 to S840.

S810: Acquire a game client preload quantity matching the target online user change quantity, and determine a computing resource demand matching the game client preload quantity.

In an application scenario of the cloud game, each additional online user indicates that the cloud server needs to allocate the cloud computing resources to a newly added game client. Based on this, according to the predicted online user change quantity, the game client preload quantity matching the predicted online user change quantity may be determined. In an example embodiment of the disclosure, the game client preload quantity may have the same numerical value as the online user change quantity.

S820: Acquire a remaining resource capacity of a cloud server cluster, where the cloud server cluster is configured to allocate the cloud computing resources to one or more cloud games.

A plurality of cloud games may be run on the cloud server cluster at the same time, and the cloud computing resources may be dynamically allocated to the cloud games according to game features of the cloud games and user quantity features. In this example embodiment of the disclosure, resource occupation of server devices in the cloud server cluster can be monitored in real time, and the remaining resource capacity of the cloud server cluster can be obtained after available resources of the server devices are gathered.

S830: Gather computing resource demands of one or more cloud games running on the cloud server cluster to obtain a total resource demand of the cloud server cluster.

Each cloud game running on the cloud server cluster may determine the computing resource demand of the cloud game accordingly, and the total resource demand of the cloud server cluster can be obtained by gathering the computing resource demands of the cloud games.

S840: Dynamically adjust, according to a numerical relationship between the remaining resource capacity and the total resource demand, the cloud computing resources allocated to the cloud game.

In an example embodiment of the disclosure, the cloud computing resources are dynamically allocated to the cloud games according to the computing resource demands of the cloud games when the remaining resource capacity is greater than or equal to the total resource demand; and resource allocation ratios of the cloud games are acquired when the remaining resource capacity is less than the total resource demand, and the cloud computing resources are dynamically allocated to the cloud games according to the resource allocation ratios and the remaining resource capacity.

In a case that the remaining resource capacity is sufficient, the cloud computing resources can be directly allocated to the cloud games according to the computing resource demands. In a case that the remaining resource capacity is insufficient, the cloud computing resources can be allocated to the cloud games according to the resource allocation ratios to ensure that the cloud games can preload the game client as required.

In an example embodiment of the disclosure, the method of acquiring the resource allocation ratios of the cloud games may include: performing data sampling on operation data of the cloud game to obtain operation monitoring data corresponding to a plurality of operation monitoring dimensions; acquiring data weights associated with the operation monitoring dimensions; performing weighted fusion on the operation monitoring data according to the data weights to obtain a resource allocation weight of the cloud game; and determining the resource allocation ratios of the cloud games according to the resource allocation weight.

In an example embodiment of the disclosure, the operation monitoring dimension may include, for example, one or more of the following dimensions: a retention ratio of users, an average game duration of users, an average queuing duration of users, and an average revenue of users. According to the impact degree, different data weights can be allocated to the operation monitoring dimensions, and cloud computing resources can be allocated among different cloud games according to the weighted fusion result, thereby ensuring the proper allocation of the cloud computing resources.

FIG. 9 schematically shows a description of weights of operation monitoring dimensions in an application scenario according to an embodiment of the disclosure. In this example embodiment of the disclosure, the operation monitoring dimension may include many dimensions such as a growth trend of online people (the online user quantity change trend), a quantity of current queuing people (the current queuing user quantity), a quantity of historical online people (the online user quantity of the cloud game in the historical time cycle), a quantity of historical queuing people (the queuing user quantity of the cloud game in the historical time cycle), an average queuing duration of users, a retention ratio of users, an average game duration of users, and an average revenue of users. The growth trend of online people directly affects the game client preload quantity, and may be configured with a higher quantity weight. The quantity of current queuing people is directly related to the allocation of game resources. If the quantity of current queuing people is greater than zero, it indicates that the game client preload quantity is insufficient, and therefore, the quantity of current queuing people may be configured with a higher quantity weight. The quantity of historical online people and the quantity of historical queuing people have important reference value for predicting a quantity of online people and an online growth rate in this cycle, and may be configured with medium quantity weights. The average queuing duration of users indicates attractiveness of the game to the users, and the retention ratio of users indicates user stickiness of the game, which may be configured with lower quantity weights respectively. The average game duration of users indicates whether the users are heavy players, and the average revenue of users is used for determining the commercial value of the game, which may be configured with medium quantity weights respectively.

Figure 10:
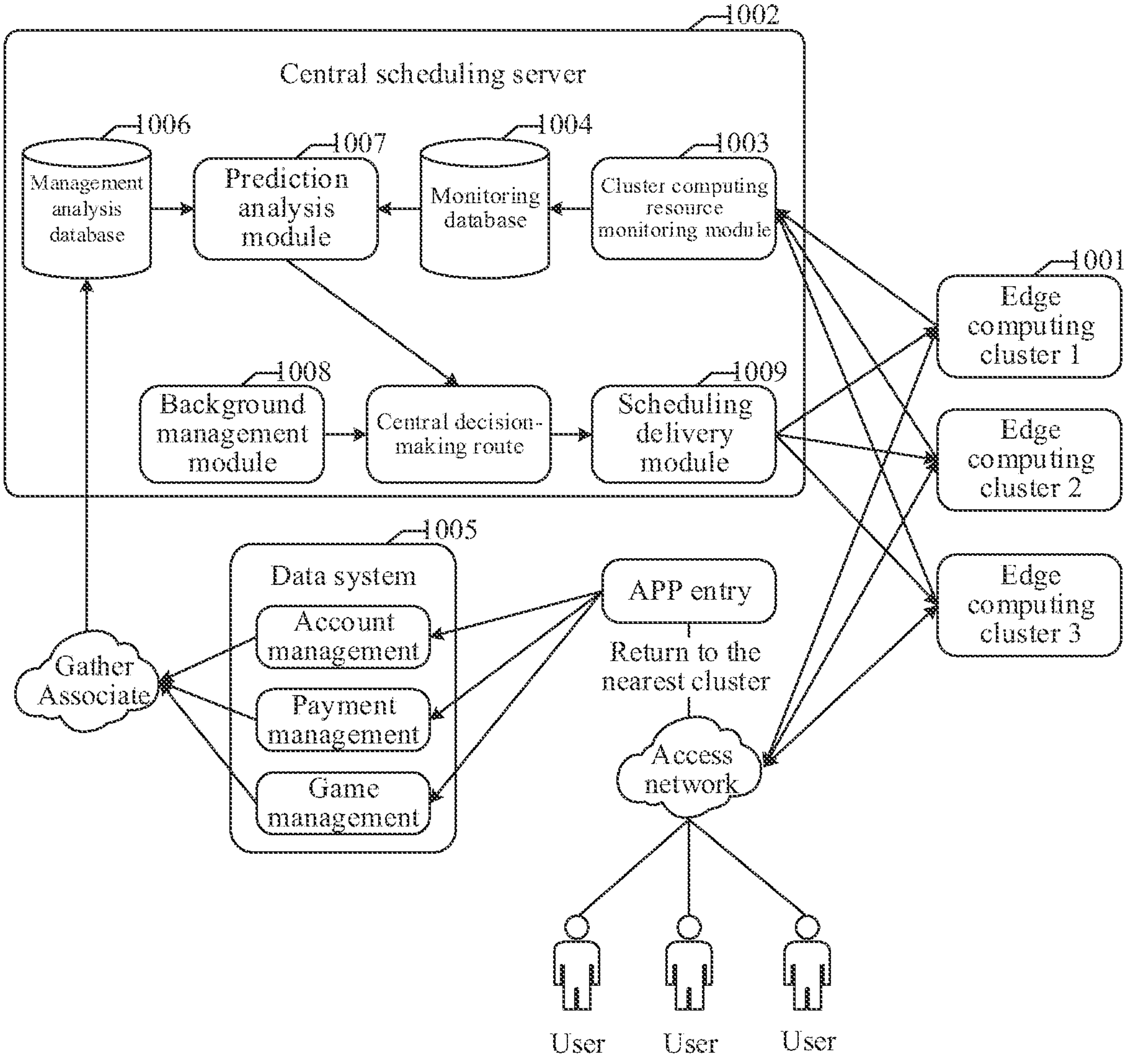
FIG. 10 schematically shows a system block diagram of implementing resource allocation of a cloud game in an application scenario according to an example embodiment of the disclosure.

FIG. 10 schematically shows a system block diagram of implementing resource allocation of a cloud game in an application scenario according to an example embodiment of the disclosure.

The cloud game has characteristics of high network requirements and high costs, which determines that a cloud gaming computing cluster is generally distributed in a plurality of regions Therefore, edge computing clusters 1001 (such as an edge computing cluster 1, an edge computing cluster 2, and an edge computing cluster 3) are needed to report online, queuing, and game distribution data of the cluster to a cluster computing resource monitoring module 1003 of a central scheduling server 1002 in real time. After receiving the data, the cluster computing resource monitoring module 1003 needs to preprocess the data to obtain data such as peak concurrent users (PCUs) and daily active users (DAUs) according to the dimensions such as the cluster, time, and game, and store the preprocessed result data and original real-time data into a monitoring database 1004.

Through a client application (APP) entry of the cloud game, a complete data system 1005 including account management, payment management, and game management may be constructed in the client APP of the cloud game, and then the data is stored into a management analysis database 1006 after gathered and associated.

A prediction analysis module 1007 may acquire and analyze the data in the monitoring database 1004 and the management analysis database 1006, so as to implement automatic management on the pre-pulling quantity of the cluster games on demand and trend according to a data analysis result. Through monitoring the data, resource usage of the clusters can be mastered, and queuing of the clusters and games can be analyzed and predicted. By managing and analyzing the data, the retention ratio of users, and the payment tendency of a single user of the games can be learned, and commercial value ratios of the games can be calculated by configuring a certain weight.

A background management module 1008, on one hand, can flexibly adjust a weight ratio of impact factors, and on the other hand, can configure a pulling ratio or an absolute quantity of some games so as to cope with emergencies such as release of a new game and a major activity.

The prediction analysis module 1007 and the background management module 1008 are connected to a scheduling delivery module 1009 through a central decision-making route. Finally, the total pulling quantity is delivered to the edge computing clusters in real time through the scheduling delivery module 1009 to preload the game client, and then the cloud computing resources are allocated.

In this example embodiment of the disclosure, accurate portraits of player groups can also be obtained through big data analysis on operational data, so as to implement more proper and scientific user screening. With reference to the capacity and cost of different edge computing clusters, a proper allocation policy of the cloud computing resources can also be provided.

Although the operations of the method in the disclosure are described in a specific order in the accompanying drawings, this does not require or imply that the operations have to be performed in the specific order, or all the operations shown have to be performed to achieve an expected result. Additionally or alternatively, some operations may be omitted, a plurality of operations may be combined into one operations, and/or operations step may be decomposed into a plurality of operations for execution, and the like.

Figure 11:
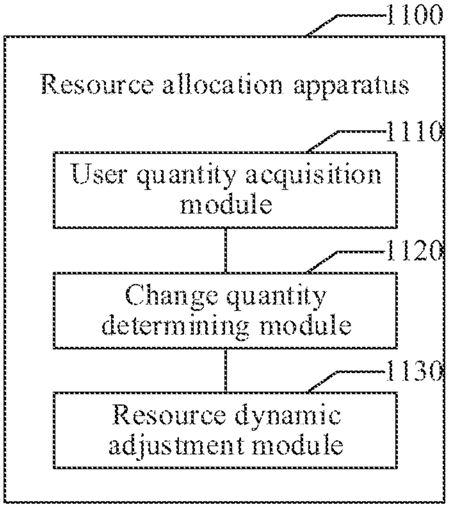
FIG. 11 schematically shows a structural block diagram of a resource allocation apparatus according to an example embodiment of the disclosure.

The following describes apparatus embodiments of the disclosure, and the apparatus embodiments may be used for performing the resource allocation method in the foregoing embodiments of the disclosure. FIG. 11 schematically shows a structural block diagram of a resource allocation apparatus according to an example embodiment of the disclosure. As shown in FIG. 11, the resource allocation apparatus 1100 may mainly include: a user quantity acquisition module 1110, configured to collect a current online user quantity of a cloud game in a current time period, and count an online user quantity of the cloud game in a historical time cycle, the historical time cycle including one or more historical time periods corresponding to the current time period; a change quantity determining module 1120, configured to predict a target online user change quantity of the cloud game in a future time period according to the current online user quantity and the online user quantity of the cloud game in the historical time cycle, the future time period being a time period with the same time length as the current time period; and a resource dynamic adjustment module 1130, configured to dynamically adjust, according to the target online user change quantity, cloud computing resources allocated to the cloud game, the cloud computing resources being used for preloading a game client.

In some example embodiments of the disclosure, based on the foregoing embodiments, the change quantity determining module 1120 includes: a value fitting module, configured to fit a online user quantity change trend of the cloud game in the current time period according to the current online user quantity; a quantity prediction module, configured to predict an initial online user change quantity of the cloud game in the future time period according to the online user quantity change trend; and a numerical adjustment module, configured to perform numerical adjustment on the initial online user change quantity according to the online user quantity of the cloud game in the historical time cycle, to obtain the target online user change quantity.

In some embodiments of the disclosure, based on the foregoing embodiments, the numerical adjustment module includes: a first time period selection module, configured to select one or more first contemporaneous time periods that have corresponding start-end time points with the current time period from the historical time cycle; a first quantity selection module, configured to select a first historical contemporaneous quantity corresponding to the first contemporaneous time period from the online user quantity of the cloud game in the historical time cycle; and a first numerical adjustment module, configured to perform weighted fusion on the first historical contemporaneous quantity and the initial online user change quantity according to a preset quantity weight to obtain the target online user change quantity, where a quantity weight of the initial online user change quantity is greater than a quantity weight of the first historical contemporaneous quantity.

In some embodiments of the disclosure, based on the foregoing embodiments, the numerical adjustment module further includes: a second time period selection module, configured to select one or more second contemporaneous time periods that have corresponding start-end time points with the future time period from the historical time cycle; and a second quantity selection module, configured to select a second historical contemporaneous quantity corresponding to the second contemporaneous time period from the online user quantity of the cloud game in the historical time cycle, where the first numerical adjustment module is configured to perform weighted fusion on the first historical contemporaneous quantity, the second historical contemporaneous quantity, and the initial online user change quantity according to the preset quantity weight to obtain the target online user change quantity, where the quantity weight of the first historical contemporaneous quantity is greater than a quantity weight of the second historical contemporaneous quantity.

In some embodiments of the disclosure, based on the foregoing embodiments, the resource allocation apparatus further includes: a queuing quantity acquisition module, configured to collect a current queuing user quantity of the cloud game in the current time period, and count a queuing user quantity of the cloud game in the historical time cycle; and a second numerical adjustment module, configured to perform numerical adjustment on the target online user change quantity according to the current queuing user quantity and the queuing user quantity of the cloud game in the historical time cycle, to obtain the target online user change quantity after the numerical adjustment, where the resource dynamic adjustment module 1130 is configured to dynamically adjust, according to the target online user change quantity after the numerical adjustment, the cloud computing resources allocated to the cloud game.

In some embodiments of the disclosure, based on the foregoing embodiments, the second numerical adjustment module is configured to: perform weighted fusion on the current queuing user quantity, the queuing user quantity of the cloud game in the historical time cycle and the target online user change quantity according to a preset quantity weight to obtain the target online user change quantity after the numerical adjustment, where a quantity weight of the target online user change quantity is greater than or equal to a quantity weight of the current queuing user quantity, and the quantity weight of the current queuing user quantity is greater than a quantity weight of the queuing user quantity of the cloud game in the historical time cycle.

In some embodiments of the disclosure, based on the foregoing embodiments, the user quantity acquisition module 1110 includes: a cycle selection module, configured to select a historical time cycle having time correlation with the current time period; a data sampling module, configured to perform data sampling on an online user quantity in the historical time cycle according to a time period length of the current time period to obtain a data sampling result; and a quantity counting module, configured to count the data sampling result to obtain the online user quantity of the cloud game in the historical time cycle.

In some embodiments of the disclosure, based on the foregoing embodiments, the cycle selection module includes: a first cycle acquisition module, configured to acquire a current time cycle in which the current time period is located, where the current time cycle has a specified time length and fixed start-end time points; and a first cycle selection module, configured to select one or more historical time cycles with the same time length as the current time cycle.

In some embodiments of the disclosure, based on the foregoing embodiments, the cycle selection module includes: a second cycle acquisition module, configured to acquire a sliding time window synchronously moving with the current time period, where the sliding time window has a specified time length and dynamic start-end time points; and a second cycle selection module, configured to select a historical time cycle continuous with the current time period according to the sliding time window.

In some embodiments of the disclosure, based on the foregoing embodiments, the resource dynamic adjustment module 1130 includes: a demand determining module, configured to acquire a game client preload quantity matching the target online user change quantity, and determine a computing resource demand matching the game client preload quantity; a remaining capacity acquisition module, configured to acquire a remaining resource capacity of a cloud server cluster, where the cloud server cluster is configured to allocate the cloud computing resources to one or more cloud games; a total demand gathering module, configured to gather computing resource demands of one or more cloud games running on the cloud server cluster to obtain a total resource demand of the cloud server cluster; and a computing resource allocation module, configured to dynamically adjust, according to a numerical relationship between the remaining resource capacity and the total resource demand, the cloud computing resources allocated to the cloud games.

In some embodiments of the disclosure, based on the foregoing embodiments, the computing resource allocation module includes: a first resource allocation module, configured to dynamically allocate the cloud computing resources to the cloud games according to the computing resource demands of the cloud games when the remaining resource capacity is greater than or equal to the total resource demand; and a second resource allocation module, configured to acquire resource allocation ratios of the cloud games when the remaining resource capacity is less than the total resource demand, and dynamically allocate the cloud computing resources to the cloud games according to the resource allocation ratios and the remaining resource capacity.

In some embodiments of the disclosure, based on the foregoing embodiments, the second resource allocation module includes: a user monitoring module, configured to perform data sampling on operation data of the cloud game to obtain operation monitoring data corresponding to a plurality of operation monitoring dimensions; a weight acquisition module, configured to acquire data weights associated with the operation monitoring dimensions; a weighted fusion module, configured to perform weighted fusion on the operation monitoring data according to the data weights to obtain a resource allocation weight of the cloud game; and a ratio determining module, configured to determine the resource allocation ratios of the cloud games according to the resource allocation weight.

Details of the resource allocation apparatus provided in the embodiments of the disclosure have been specifically described in the corresponding method embodiments, and details are not described herein again.

Figure 12:
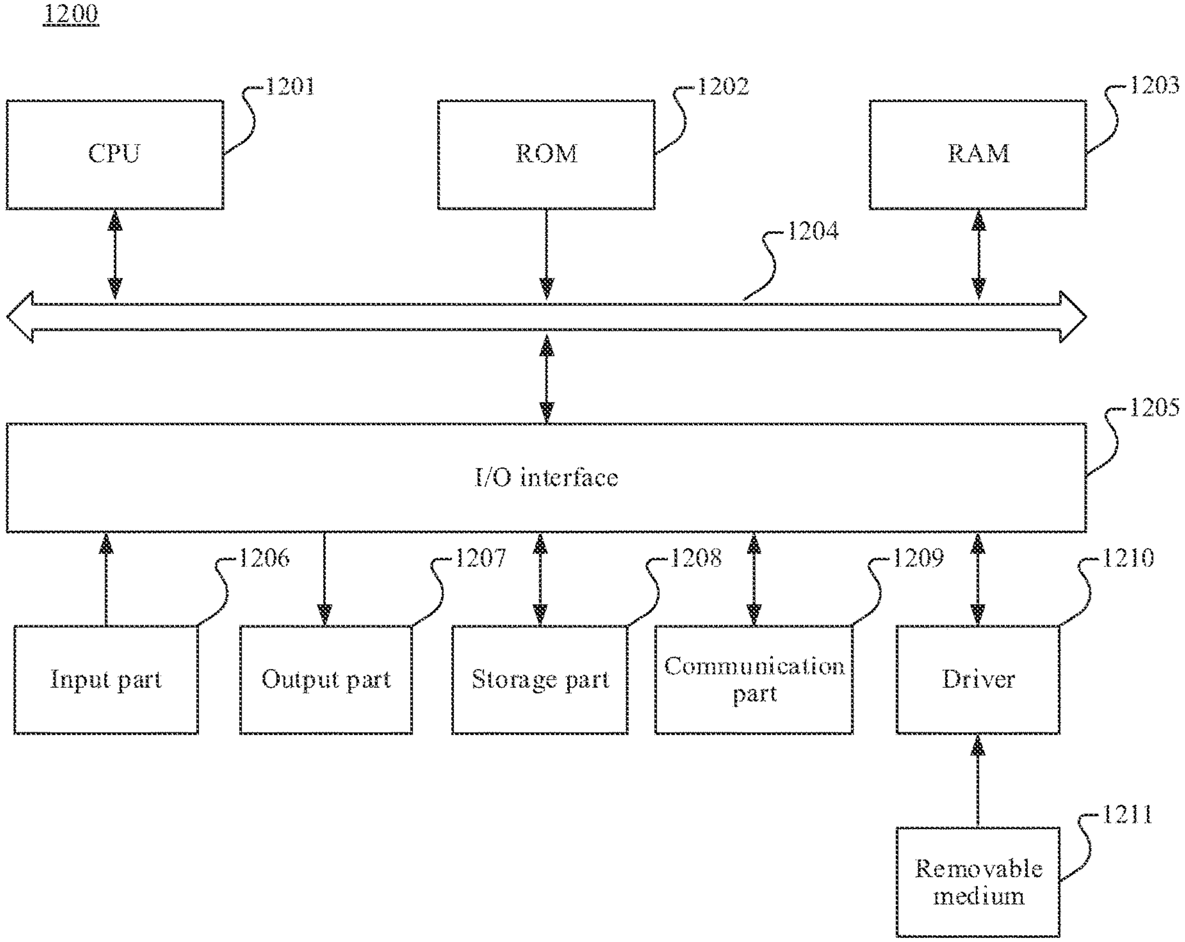
FIG. 12 schematically shows a structural block diagram of a computer system adapted to implement an electronic device according to an example embodiment of the disclosure.

FIG. 12 schematically shows a structural block diagram of a computer system adapted to implement an electronic device according to an example embodiment of the disclosure.

The computer system 1200 of the electronic device shown in FIG. 12 is merely an example, and does not constitute any limitation on functions and use ranges of the example embodiments of the disclosure.

As shown in FIG. 12, the computer system 1200 includes a central processing unit (CPU) 1201. The CPU 1201 may perform various appropriate actions and processing according to a program stored in a read-only memory (ROM) 1202 or a program loaded from a storage portion 1208 into a random access memory (RAM) 1203. The RAM 1203 further stores various programs and data required for operating the system. The CPU 1201, the ROM 1202, and the RAM 1203 are connected to each other through a bus 1204. An input/output (I/O) interface 1205 is also connected to the bus 1204.

The following components are connected to the I/O interface 1205: an input part 1206 including a keyboard, a mouse, and the like; an output part 1207 including a cathode ray tube (CRT), a liquid crystal display (LCD), a loudspeaker and the like; a storage part 1208 including a hard disk, and the like; and a communication part 1209 including a network interface card such as an local area network card, a modem, and the like. The communication part 1209 performs communication processing by using a network such as the Internet. A driver 1210 is also connected to the I/O interface 1205 as required. A removable medium 1211, such as a magnetic disk, an optical disc, a magneto-optical disk, or a semiconductor memory, is mounted on the driver 1210 as required, so that a computer program read from the removable medium is installed into the storage part 1208 as required.

Particularly, according to an example embodiment of the disclosure, the processes described in the method flowcharts may be implemented as a computer software program. For example, an example embodiment of the disclosure includes a computer program product. The computer program product includes a computer program carried on a computer-readable medium. The computer program includes a program code used for performing the method shown in the flowchart. In such an embodiment, by using the communication part 1209, the computer program may be downloaded and installed from a network, and/or installed from the removable medium 1211. When the computer program is executed by the CPU 1201, various functions defined in the system of the disclosure are executed.

The computer-readable medium shown in this example embodiment of the disclosure may be a computer-readable signal medium or a computer-readable storage medium or any combination thereof. The computer-readable storage medium may be, for example, but is not limited to, an electric, magnetic, optical, electromagnetic, infrared, or semi-conductive system, apparatus, or device, or any combination of the above. More specific examples of the computer-readable storage medium may include, but are not limited to: an electrical connection having one or more wires, a portable computer magnetic disk, a hard disk, a RAM, a ROM, an erasable programmable ROM (EPROM), a flash memory, an optical fiber, a compact disk ROM (CD-ROM), an optical storage device, a magnetic storage device, or any appropriate combination thereof. In the disclosure, the computer-readable storage medium may be any tangible medium including or storing a program, and the program may be used by or used in combination with an instruction execution system, an apparatus, or a device. In the disclosure, the computer-readable signal medium may include a data signal being in a baseband or propagated as a part of a carrier wave, the data signal carrying a computer-readable program code. The propagated data signal may be in a plurality of forms, including, but not limited to, an electromagnetic signal, an optical signal, or any appropriate combination thereof. The computer-readable signal medium may be further any computer-readable medium in addition to a computer-readable storage medium. The computer-readable medium may send, propagate, or transmit a program that is used by or used in combination with an instruction execution system, apparatus, or device. The program code included in the computer-readable medium may be transmitted by using any suitable medium, including but not limited to: a wireless medium, a wired medium, or the like, or any suitable combination thereof.

The flowcharts and block diagrams in the accompanying drawings illustrate possible system architectures, functions and operations that may be implemented by a system, a method, and a computer program product according to various embodiments of the disclosure. In this regard, each box in the flowchart or the block diagram may represent a module, a program segment, or a part of code. The module, the program segment, or the part of code includes one or more executable instructions used for implementing specified logic functions. In some implementations used as substitutes, functions annotated in boxes may alternatively occur in a sequence different from that annotated in an accompanying drawing. For example, two boxes shown in succession may actually be performed basically in parallel, and sometimes the two boxes may be performed in a reverse sequence. This is determined by a related function. Each box in the block diagram or the flowchart, and a combination of boxes in the block diagram or the flowchart may be implemented by using a dedicated hardware-based system that performs a specified function or operation, or may be implemented by using a combination of dedicated hardware and computer instructions.

Although several modules or units of a device for action execution are mentioned in the foregoing detailed descriptions, the division is not mandatory. Actually, according to the implementations of the disclosure, the features and functions of two or more modules or units described above may be specified in one module or unit. Conversely, the features and functions of one module or unit described above may be further divided into to be specified by a plurality of modules or units.

According to the foregoing descriptions of the implementations, a person skilled in the art can easily understand that the exemplary implementations described herein may be implemented by software, or may be implemented by combining software with necessary hardware. Therefore, the technical solutions of the embodiments of the disclosure may be implemented in a form of a software product. The software product may be stored in a non-volatile storage medium (which may be a CD-ROM, a USB flash drive, a removable hard disk, or the like) or on the network, including several instructions for instructing a computing device (which may be a personal computer, a server, a touch terminal, a network device, or the like) to perform the methods according to the embodiments of the disclosure.

After considering the specification and practicing the present disclosure disclosed herein, a person skilled in the art may easily conceive of other implementations of the disclosure. The disclosure is intended to cover any variations, uses, or adaptive changes of the disclosure. These variations, uses, or adaptive changes follow the general principles of the disclosure and include common general knowledge or common technical means in the art, which are not disclosed in the disclosure.

It is to be understood that the disclosure is not limited to the precise structures described above and shown in the accompanying drawings, and various modifications and changes may be made without departing from the scope of the disclosure. The scope of the disclosure is limited only by the appended claims.

What is claimed is:

1. A resource allocation method, performed by an electronic device, the resource allocation method comprising:

collecting a current online user count of a cloud game in a current time period, and identifying an online user count of the cloud game in a historical time cycle, the historical time cycle comprising one or more historical time periods corresponding to the current time period;

predicting a target online user count change of the cloud game in a future time period according to the current online user count and the online user count of the cloud game in the historical time cycle, the future time period being a time period having a same time length as the current time period, wherein the current online user count includes a quantity sequence formed by a plurality of real-time users;

linearly fitting the quantity sequence using a least square method to obtain an online user count change trend of the cloud game in the current time period according to the current online user count;

predicting an initial online user count change of the cloud game in the future time period according to the online user count change trend;

dynamically adjusting, according to the initial online user count change and the target online user count change, cloud computing resources allocated to the cloud game; and preloading and executing a game client based on the cloud computing resources, wherein the resource allocation method further comprises performing numerical adjustment on the initial online user count change according to the online user count of the cloud game in the historical time cycle by:

selecting a first time period that has start-end time points that correspond to the start-end time points of the current time period from the historical time cycle;

selecting a first historical online user count corresponding to the first time period from the online user count of the cloud game in the historical time cycle; and performing weighted fusion on the first historical online user count and the initial online user count change according to a preset quantity weight of the first historical online user count and a preset quantity weight of the initial online user count change to obtain the target online user count change.

2. The resource allocation method according to claim 1, wherein a quantity weight of the initial online user count change is greater than a quantity weight of the first historical online user count.

3. The resource allocation method according to claim 2, wherein before the performing the weighted fusion, the resource allocation method further comprises:

selecting a second time period that has start-end time points that correspond to the start-end time points of the future time period from the historical time cycle; and selecting a second historical online user count corresponding to the second time period from the online user count of the cloud game in the historical time cycle, wherein the performing weighted fusion on the first historical online user count and the initial online user count change according to a preset count weight to obtain the target online user count change comprises:

performing weighted fusion on the first historical online user count, the second historical online user count, and the initial online user count change according to the preset count weight to obtain the target online user count change, wherein a count weight of the first historical online user count is greater than a count weight of the second historical online user count.

4. The resource allocation method according to claim 1, wherein before the dynamically adjusting, the resource allocation method further comprises:

collecting a current queuing user count of the cloud game in the current time period, and counting a queuing user count of the cloud game in the historical time cycle; and performing the numerical adjustment on the target online user count change according to the current queuing user count and the queuing user count of the cloud game in the historical time cycle, to obtain the target online user count change after the numerical adjustment; and wherein the dynamically adjusting comprises:

dynamically adjusting, according to the target online user count change after the numerical adjustment, the cloud computing resources allocated to the cloud game.

5. The resource allocation method according to claim 4, wherein the performing the numerical adjustment comprises:

performing the weighted fusion on the current queuing user count, the queuing user count of the cloud game in the historical time cycle and the target online user count change according to a preset quantity weight to obtain the target online user count change after the numerical adjustment, wherein a quantity weight of the target online user count change is greater than or equal to a quantity weight of the current queuing user count, and the quantity weight of the current queuing user count is greater than a quantity weight of the queuing user count of the cloud game in the historical time cycle.

6. The resource allocation method according to claim 1, wherein the identifying the online user count of the cloud game comprises:

selecting a historical time cycle having time correlation with the current time period;

performing data sampling on an online user count in the historical time cycle according to a time period length of the current time period to obtain a data sampling result; and counting the data sampling result to obtain the online user count of the cloud game in the historical time cycle.

7. The resource allocation method according to claim 6, wherein the selecting a historical time cycle having time correlation with the current time period comprises:

acquiring a current time cycle in which the current time period is located, wherein the current time cycle has a specified time length and fixed start-end time points; and selecting one or more historical time cycles having the same time length as the current time cycle.

8. The resource allocation method according to claim 6, wherein the selecting the historical time cycle having time correlation with the current time period comprises:

acquiring a sliding time window synchronously moving with the current time period, wherein the sliding time window has a specified time length and dynamic start-end time points; and selecting a historical time cycle continuous with the current time period according to the sliding time window.

9. The resource allocation method according to claim 1, wherein the dynamically adjusting comprises:

acquiring a game client preload quantity matching the target online user count change, and determining a computing resource demand matching the game client preload quantity;

acquiring a remaining resource capacity of a cloud server cluster, wherein the cloud server cluster is configured to allocate the cloud computing resources to one or more cloud games;

gathering computing resource demands of one or more cloud games running on the cloud server cluster to obtain a total resource demand of the cloud server cluster; and dynamically adjusting, according to a numerical relationship between the remaining resource capacity and the total resource demand, the cloud computing resources allocated to the one or more cloud games.

10. The resource allocation method according to claim 9, wherein the dynamically adjusting comprises:

dynamically allocating the cloud computing resources to the one or more cloud games according to the computing resource demands of the one or more cloud games when the remaining resource capacity is greater than or equal to the total resource demand; and acquiring resource allocation ratios of the one or more cloud games when the remaining resource capacity is less than the total resource demand, and dynamically allocating the cloud computing resources to the one or more cloud games according to the resource allocation ratios and the remaining resource capacity.

11. The resource allocation method according to claim 10, wherein the acquiring resource allocation ratios of the one or more cloud games comprises:

performing data sampling on operation data of the cloud game to obtain operation monitoring data corresponding to a plurality of operation monitoring dimensions;

acquiring data weights associated with the operation monitoring dimensions;

performing the weighted fusion on the operation monitoring data according to the data weights to obtain a resource allocation weight of the cloud game; and determining the resource allocation ratios of the one or more cloud games according to the resource allocation weight.

12. A resource allocation apparatus, deployed on an electronic device, the resource allocation apparatus comprising:

at least one memory configured to store program code; and at least one processor configured to read the program code and operate as instructed by the program code, the program code comprising:

user count acquisition code, configured to cause the at least one processor to collect a current online user count of a cloud game in a current time period, and identify an online user count of the cloud game in a historical time cycle, the historical time cycle comprising one or more historical time periods corresponding to the current time period;

change quantity determining code, configured to cause the at least one processor to predict a target online user count change of the cloud game in a future time period according to the current online user count and the online user count of the cloud game in the historical time cycle, the future time period being a time period having the same time length as the current time period, wherein the current online user count includes a quantity sequence formed by a plurality of real-time users;

fitting code, configured to cause the at least one processor to linearly fit the quantity sequence using a least square method to obtain an online user count change trend of the cloud game in the current time period according to the current online user count;

predicting code, configured to cause the at least one processor to predict an initial online user count change of the cloud game in the future time period according to the online user count change trend;

resource dynamic adjustment code, configured to cause the at least one processor to dynamically adjust, according to the target online user count change, cloud computing resources allocated to the cloud game; and executing code, configured to cause the at least one processor to preload and execute a game client based on the cloud computing resources, wherein the at least one processor is further configured to read the program code and operate as instructed by the program code to perform numerical adjustment on the initial online user count change according to the online user count of the cloud game in the historical time cycle, the program code comprising:

first selecting code, configured to cause the at least one processor to select a first time period that has start-end time points that correspond to the start-end time points of the current time period from the historical time cycle;

second selecting code, configured to cause the at least one processor to select a first historical online user count corresponding to the first time period from the online user count of the cloud game in the historical time cycle; and performing code, configured to cause the at least one processor to perform weighted fusion on the first historical online user count and the initial online user count change according to a preset quantity weight of the first historical online user count and a preset quantity weight of the initial online user count change to obtain the target online user count change.

13. The resource allocation apparatus according to claim 12, wherein the change quantity determining code is configured to cause the at least one processor to perform numerical adjustment on the initial online user count change according to the online user count of the cloud game in the historical time cycle, to obtain the target online user count change, wherein a quantity weight of the initial online user count change is greater than a quantity weight of the first historical online user count.

14. The resource allocation apparatus according to claim 13, wherein the change quantity determining code is further configured to, before the performing weighted fusion on the first historical online user count and the initial online user count change according to a preset quantity weight to obtain the target online user count change, cause the at least one processor to:

select a second time period that has start-end time points that correspond to the start-end time points of the future time period from the historical time cycle; and select a second historical online user count corresponding to the second time period from the online user count of the cloud game in the historical time cycle, wherein the change quantity determining code configured to cause the at least one processor to perform weighted fusion on the first historical online user count and the initial online user count change according to a preset quantity weight to obtain the target online user count change is further configured to cause the at least one processor to:

perform weighted fusion on the first historical online user count, the second historical online user count, and the initial online user count change according to the preset quantity weight to obtain the target online user count change, wherein the quantity weight of the first historical online user count is greater than a quantity weight of the second historical online user count.

15. The resource allocation apparatus according to claim 12, wherein the resource dynamic adjustment code is configured to, before the dynamically adjusting, according to the target online user count change, cloud computing resources allocated to the cloud game, cause the at least one processor to:

collect a current queuing user count of the cloud game in the current time period, and count a queuing user count of the cloud game in the historical time cycle; and perform numerical adjustment on the target online user count change according to the current queuing user count and the queuing user count of the cloud game in the historical time cycle, to obtain the target online user count change after the numerical adjustment; and the resource dynamic adjustment code, configured to cause the at least one processor to dynamically adjust, according to the target online user count change, cloud computing resources allocated to the cloud game, is further configured to cause the at least one processor to:

dynamically adjust, according to the target online user count change after the numerical adjustment, the cloud computing resources allocated to the cloud game.

16. The resource allocation apparatus according to claim 15, wherein the change quantity determining code configured to cause the at least one processor to perform numerical adjustment on the target online user count change according to the current queuing user count and the queuing user count of the cloud game in the historical time cycle, to obtain the target online user count change after the numerical adjustment, is further configured to cause the at least one processor to:

perform weighted fusion on the current queuing user count, the queuing user count of the cloud game in the historical time cycle and the target online user count change quantity according to a preset quantity weight to obtain the target online user count change after the numerical adjustment, wherein a quantity weight of the target online user count change is greater than or equal to a quantity weight of the current queuing user count, and the quantity weight of the current queuing user count is greater than a quantity weight of the queuing user count of the cloud game in the historical time cycle.

17. The resource allocation apparatus according to claim 12, wherein the user count acquisition code configured to count an online user count of the cloud game in a historical time cycle is further configured to cause the at least one processor to:

select a historical time cycle having time correlation with the current time period;

perform data sampling on an online user count in the historical time cycle according to a time period length of the current time period to obtain a data sampling result; and count the data sampling result to obtain the online user count of the cloud game in the historical time cycle.

18. A non-transitory computer-readable storage medium, storing a computer program that when executed by at least one processor causes the at least one processor to:

collect a current online user count of a cloud game in a current time period, and count an online user count of the cloud game in a historical time cycle, the historical time cycle comprising one or more historical time periods corresponding to the current time period;

predict a target online user count change of the cloud game in a future time period according to the current online user count and the online user count of the cloud game in the historical time cycle, the future time period being a time period having a same time length as the current time period, wherein the current online user count includes a quantity sequence formed by a plurality of real-time users;

linearly fit the quantity sequence using a least square method to obtain an online user count change trend of the cloud game in the current time period according to the current online user count;

predict an initial online user count change of the cloud game in the future time period according to the online user count change trend;

dynamically adjust, according to the target online user count change, cloud computing resources allocated to the cloud game; and preload and execute a game client being based on the cloud computing resources, wherein the computer program, when executed by the at least one processor, causes the at least one processor to:

select a first time period that has start-end time points that correspond to the start-end time points of the current time period from the historical time cycle;

select a first historical online user count corresponding to the first time period from the online user count of the cloud game in the historical time cycle; and perform weighted fusion on the first historical online user count and the initial online user count change according to a preset quantity weight of the first historical online user count and a preset quantity weight of the initial online user count change to obtain the target online user count change.

* * * * *